INVENTOR.
Donald R. Holm
Harry W. Mulcahy
BY Edward A. Jurow
Atty.

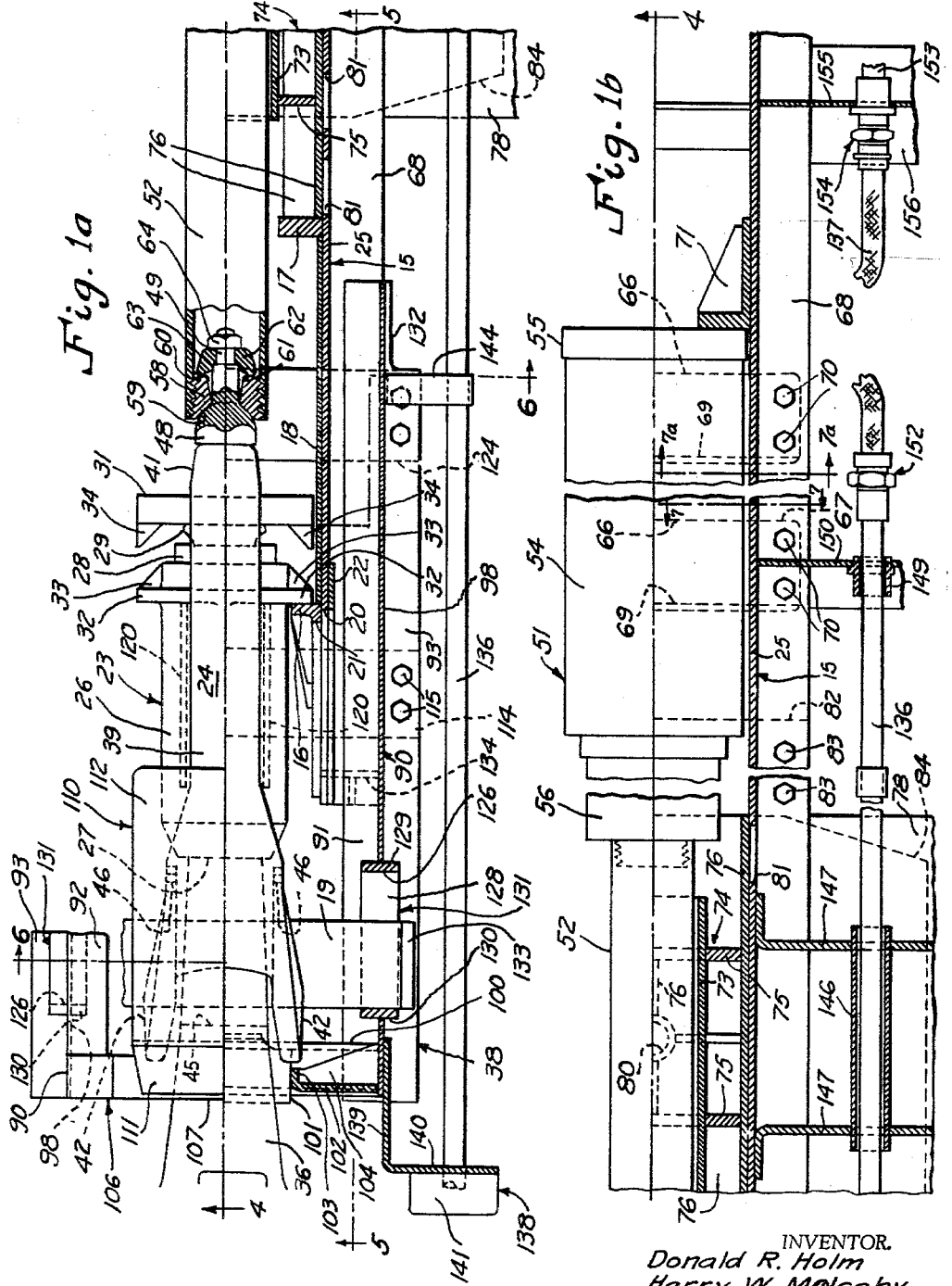

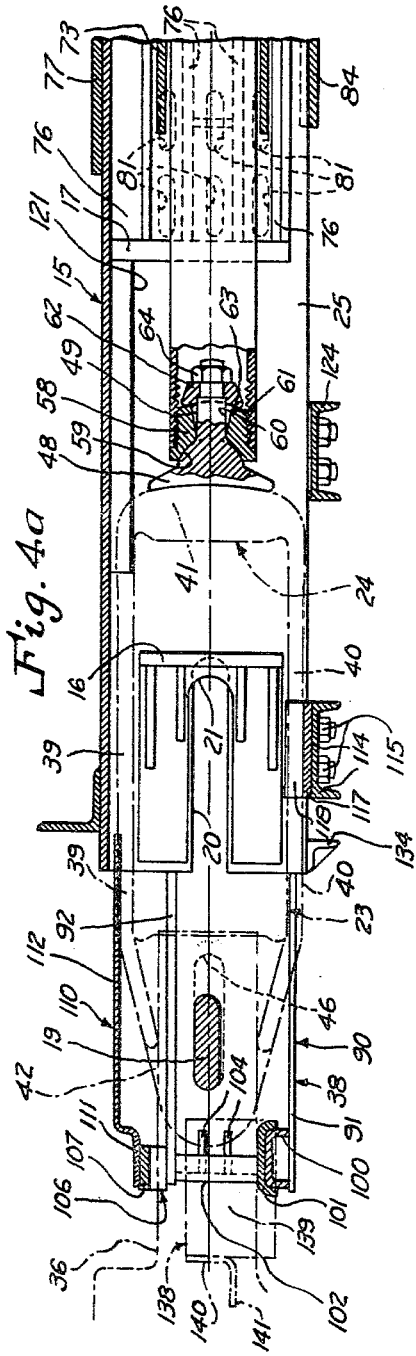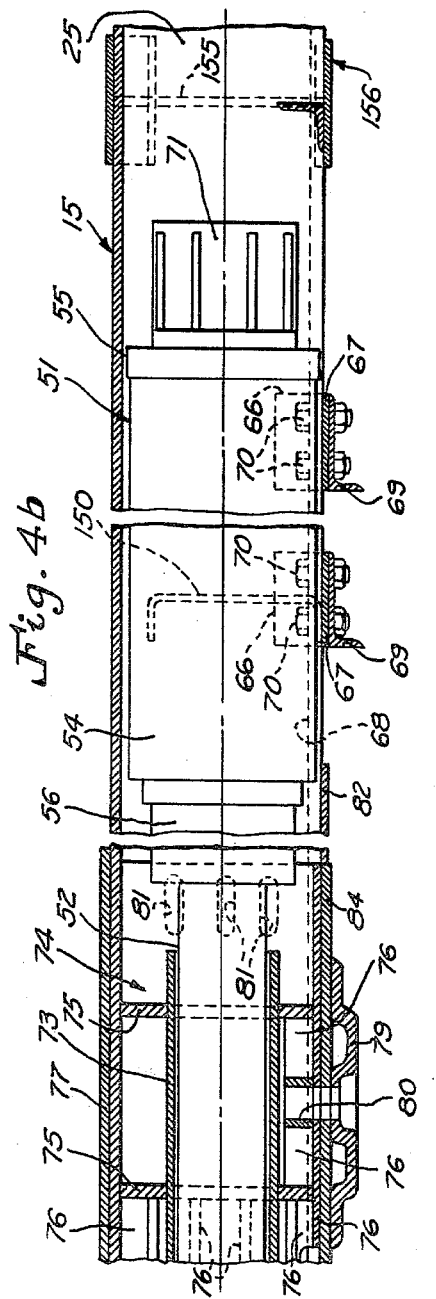

April 6, 1965  H. W. MULCAHY ETAL  3,176,855
SHOCK ABSORBING SYSTEM
Filed Feb. 18, 1963  6 Sheets-Sheet 4
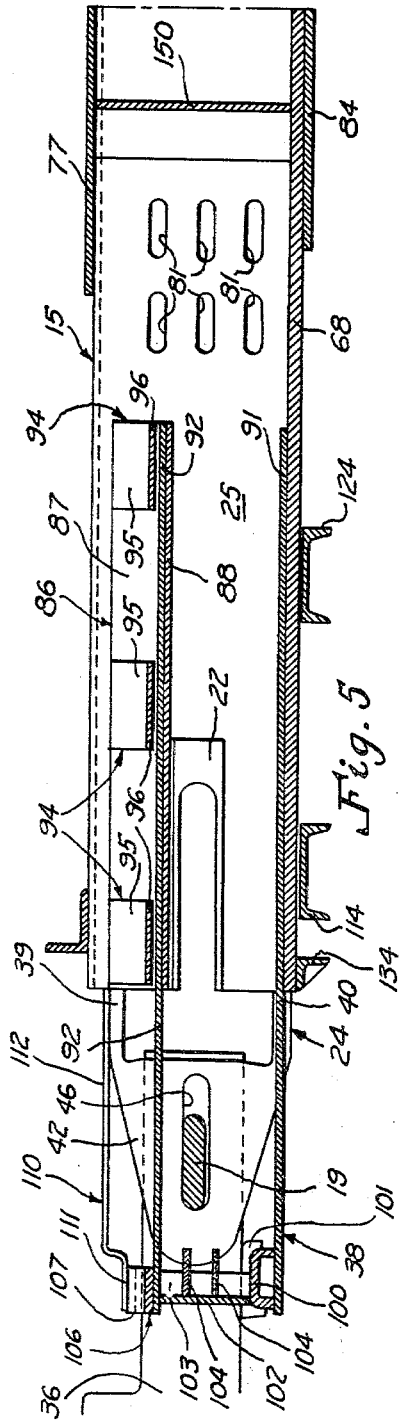
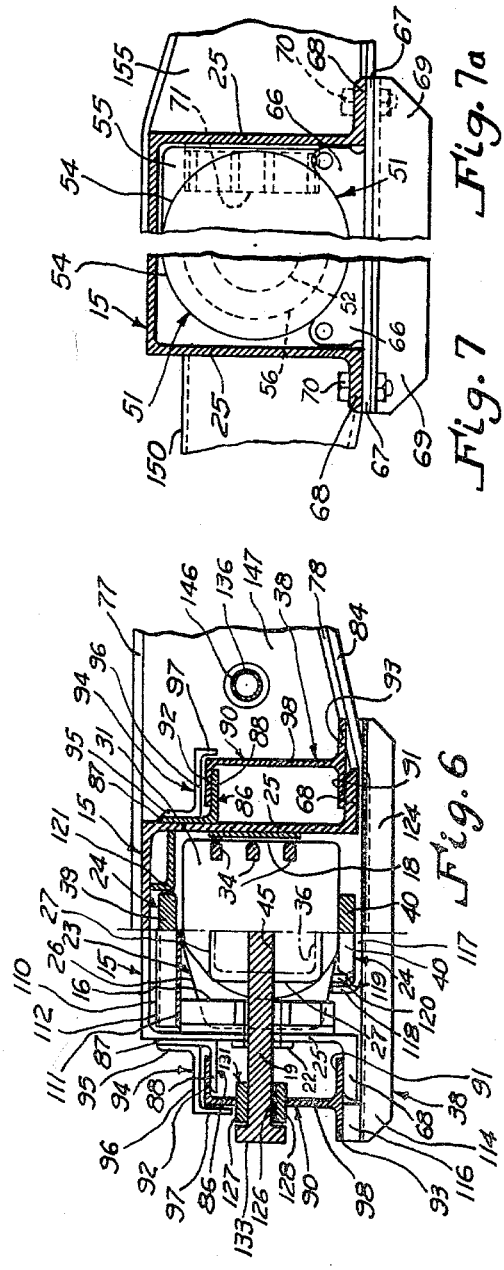
INVENTOR.
Donald R. Holm
Harry W. Mulcahy
BY Edward A. Jurow
Atty.

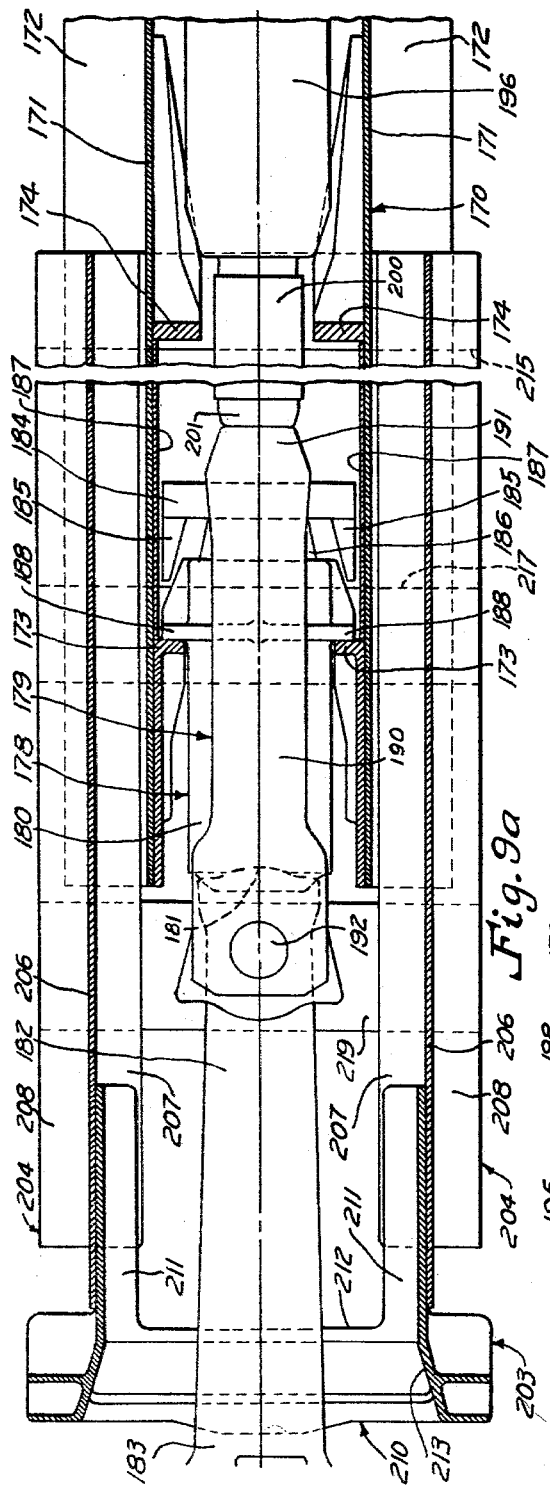
Fig.9a
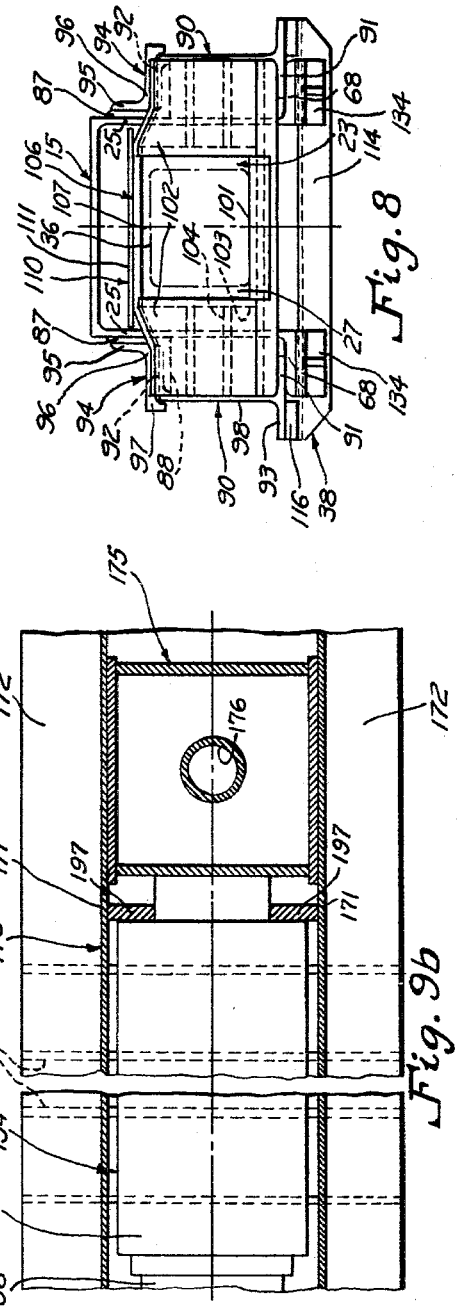
Fig.8
Fig.9b
INVENTOR.
Donald R. Holm
Harry W. Mulcahy
BY Edward A. Jurow
Atty.

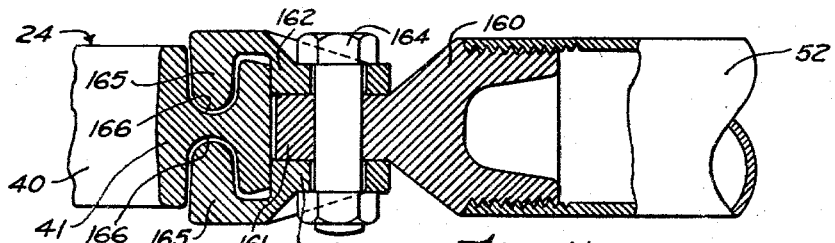
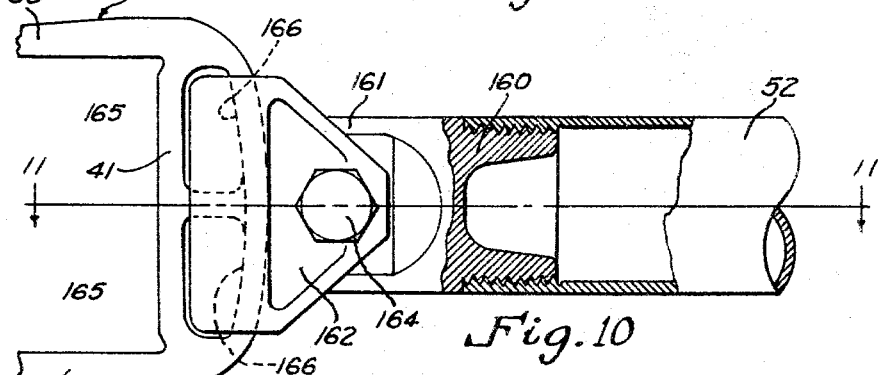
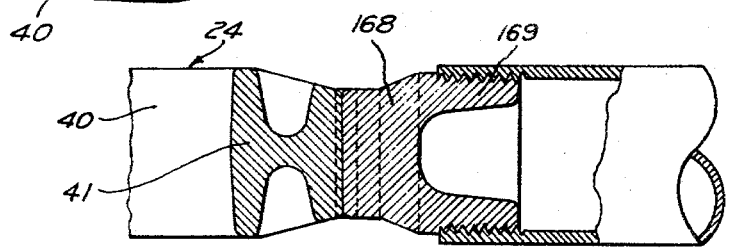
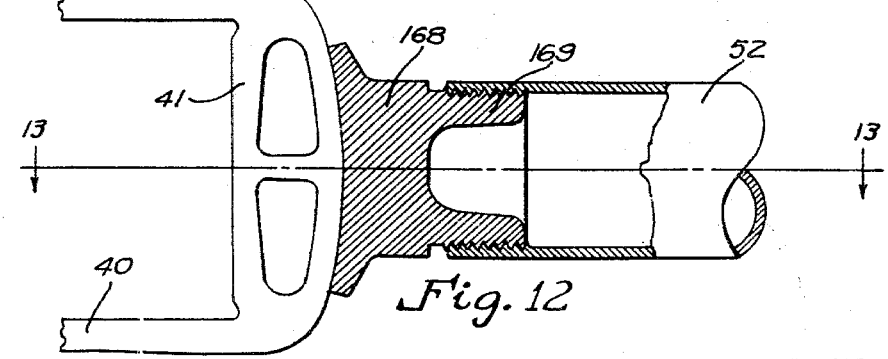

United States Patent Office 3,176,855
Patented Apr. 6, 1965

3,176,855
SHOCK ABSORBING SYSTEM
Harry W. Mulcahy, Chicago Heights, and Donald R. Holm, Markham, Ill., assignors to W. H. Miner, Inc., Chicago, Ill., a corporation of Delaware
Filed Feb. 18, 1963, Ser. No. 259,002
22 Claims. (Cl. 213—43)

The present invention relates to a shock absorbing system for railway cars and, more particularly, to a long-travel shock absorbing system which provides super-cushioning characteristics during the application of buff forces to the car coupler.

It is the general object of the present invention to provide a new and novel long-travel shock absorbing system for railway freight cars which has adequate cushioning capacity upon the application of buff forces to the car coupler to protect fragile ladings without the necessity of using lading anchors, cargo braces, and elaborate deck cushioning arrangements, such as those commonly used on fifth-wheel stands, sliding racks, and elastic tie-downs.

Another object of the present invention is to provide a new and novel long-travel super-cushioning shock absorbing system which offers a large measure of protection to the lading and car structure of adjacent cars as well as to its own lading and structure during normal train operation and particularly upon car impacting, as during train make-up and switching operations.

Another important object of the present invention is to provide, in a railway car having a stationary center sill including a draft gear pocket at its outer end, a new and novel draft gear, preferably of the friction type, which is mounted in a yoke for movement longitudinally of the draft gear pocket for a distance approximately equal to the length thereof and, in combination therewith, a separate cushioning device, preferably a long stroke hydraulic unit, which is mounted in the center sill inwardly of the draft gear pocket and is serially connected to the draft gear yoke in a manner such that it is adapted to cooperate with the draft gear in absorbing buff forces applied to the car coupler.

Another important object of the present invention is to provide a new and novel shock absorbing system of the character described wherein the friction draft gear thereof is characterized by a pair of follower members, one of which is rigid with the draft gear casing at the open friction end thereof and the other of which is movable relatively toward same during closure of the draft gear, which follower members are engageable, respectively, with longitudinally spaced outer and inner stop members defining the opposite ends of the draft gear pocket with the normal maximum spacing between the two follower members being substantially less than the length of the draft gear pocket whereby to accommodate the long travel of the draft gear relative thereto.

A further object of the present invention is to provide a new and novel shock absorbing system of the character described wherein the friction draft gear is mounted in the center sill with the open friction end of the draft gear casing disposed inwardly and with the major portion thereof normally projecting outwardly beyond the outer end of the draft gear pocket, the hydraulic cushion unit being adapted to normally retain the draft gear in its outermost position against the outer stop members.

Another important object of the present invention is to provide, in a long-travel super-cushioning shock absorber system of the character described, a coupler and yoke carrier which is slidably mounted on the stationary center sill at the outer end thereof and which is characterized by transversely extending portions which are disposed outwardly of the outer end of the center sill and are adapted for supporting the overhanging coupler member, with a movement-transmitting connection being provided between the coupler and yoke carrier and either the draft gear, yoke, or coupler member.

A further object of the present invention is to provide, in a long-travel shock absorbing system and coupler carrier arrangement of the character described, a non-flexible floating train line portion which is mounted on the coupler carrier for longitudinal movement therewith and which is connected at its inner end to the balance of the train line by a section of flexible hose.

Another important object of the present invention is to provide a new and novel long-travel super-cushioning shock absorbing system of the character described which, upon the application of buff forces, has a capacity of approximately 350,000 foot-pounds at a reaction of 300,000 pounds and a capacity of approximately 583,000 foot-pounds at a reaction of 500,000 pounds whereby to accommodate impact speeds of approximately 10 miles per hour and 12.9 miles per hour, respectively, and which, upon the application of draft forces, has a capacity of approximately 23,000 foot-pounds at a reaction of 350,000 pounds which is approximately the average of A.A.R. standard friction gears.

A still further important object of the present invention is to provide a new and novel long-travel super-cushioning shock absorbing system of the character described which utilizes standard car couplers and yokes and which is adapted to be mounted in rigid center sill structures having draft gear pockets of A.A.R. standard sizes, whereby the shock absorbing system of the invention may be readily applicable to existing railway freight cars with a minimum of structural modification required therein.

Another important object of the present invention is to provide a long-travel super-cushioning shock absorbing system of the character described including a friction draft gear and a hydraulic cushion unit which is serially connected therewith wherein, when the system is installed in a standard car underframe having an overhang of 5'6" between the outer face of the striker plate and the center line of the body bolster, the hydraulic cushion unit is mounted inwardly of the body bolster and is connected to the draft gear yoke by a drive rod which extends through a guide tube which is mounted in the body bolster, and wherein, when the system is installed in a long overhang car underframe with the distance between the outer face of the striker plate and the center line of the body bolster being 11'10", the hydraulic cushion unit is mounted between the draft gear pocket and the body bolster and is connected to the draft gear yoke by a short drive rod.

Another object of the present invention is to provide a new and novel shock absorbing system of the character described wherein the connection between the drive rod of the hydraulic cushion unit and the yoke may be a swivel connection which permits a degree of horizontal and vertical movement of the yoke while maintaining proper longitudinal alignment of the drive rod.

Another object of the present invention is to provide a new and novel shock absorbing system of the character described which when installed in a railway car does not lessen the ability of same to negotiate short radius curves but which permits negotiation of curves of the same radius that could be negotiated by a similar car equipped with standard draft gear rigging.

A still further object of the present invention is to provide a new and novel long-travel super-cushioning shock absorbing system of the character described which maintains its own structural integrity under severe impact conditions but wherein, in the event of a failure in the hydraulic cushion unit, the novel draft gear thereof may be blocked within the draft gear pocket so that the car will not be fully disabled but will have normal buff and draft force cushioning capacities.

Other objects, advantages and modifications of our invention will become apparent or be obvious from a consideration of the following description when taken in conjunction with the appended drawings in which:

FIGURES 1a and 1b together form a longitudinally broken plan view of one embodiment of the shock absorbing system of the present invention in its neutral condition, with certain parts being shown in horizontal section and with certain identical structure on the far side of the longitudinal center line not being illustrated for purposes of clarity;

Figure 3:
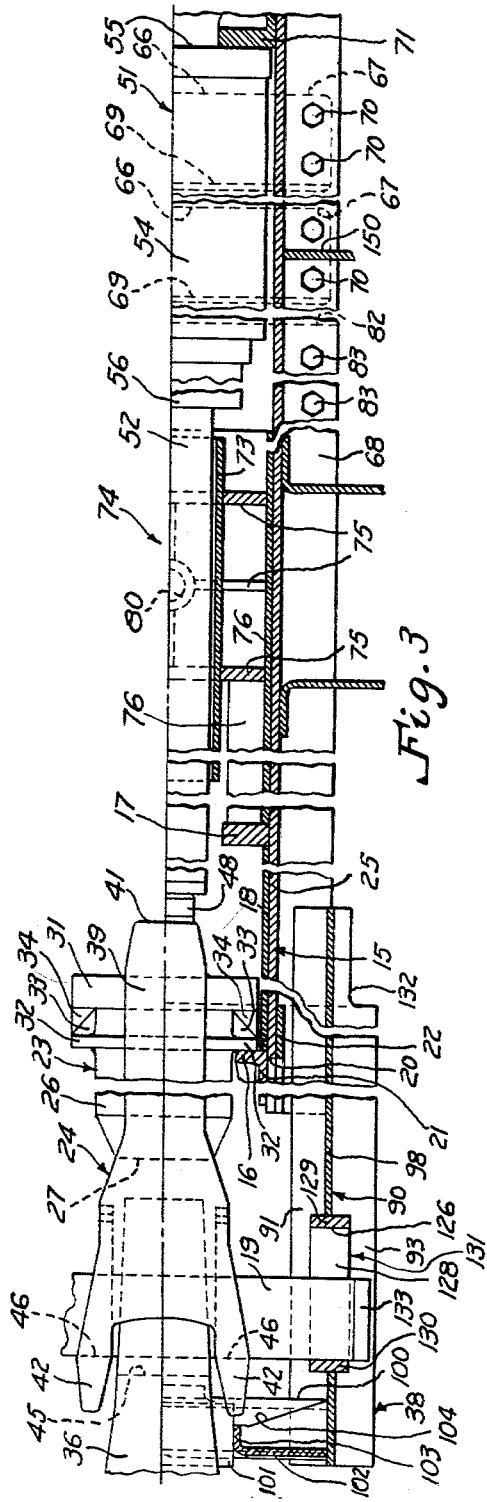
FIGURE 3 is a longitudinally broken top plan view similar to FIGURES 1a, 1b and 2 of the shock absorbing system thereof when full draft forces are applied thereto.

FIGURES 4a and 4b together form a longitudinally broken vertical section taken generally on the line 4—4 of FIGURES 1a and 1b;

FIGURE 5 is a transverse vertical section taken generally on the line 5—5 of FIGURE 1a;

FIGURE 6 is a transverse vertical section taken generally on the line 6—6 of FIGURE 1a;

FIGURE 7 is a transverse vertical section taken generally on the line 7—7 of FIGURE 1b;

FIG. 7a is a transverse vertical section taken generally on the line 7a—7a of FIG. 1b;

FIGURE 8 is an end elevational view looking toward the outer end of the shock absorbing system of the invention as illustrated in FIGURES 1a and 1b with the train line, the supports therefor, and the draft key slot for the coupler carrier not being shown;

FIGURES 9a and 9b together form a longitudinally broken top plan view of a modified form of the shock absorbing system of the present invention, with certain parts being shown in horizontal section;

FIGURE 10 is an enlarged scale side elevational view partially in vertical section of a different form of a swivel connection between the yoke butt and the cushion unit drive rod of the shock absorbing system as illustrated in FIGURE 1a;

FIGURE 11 is a horizontal section taken generally on the line 11—11 of FIGURE 10;

FIGURE 12 is an enlarged scale side elevational view partially in vertical section of a rigid form of connection between the yoke butt and the cushion unit drive rod of the shock absorbing system as illustrated in FIGURE 1a; and FIGURE 13 is a horizontal section taken generally on the line 13—13 of FIGURE 12.

Referring now to FIGURES 1-8 of the drawings, there is shown one form of the shock absorber system of the present invention which is adapted to be operatively associated with a standard railway freight car having an underframe of the type which is characterized by a longitudinally extending, inverted generally U-shaped center sill 15 having an overhang of approximately 5′6″ between the center line of the body bolster and the outer face of the usual striker plate. The center sill 15 is stationary relative to the railway car and a draft gear pocket having a standard length of 24⅝″ is defined in the outer end thereof by pairs of longitudinally spaced outer stop members or draft lugs 16—16 and inner stop members or buff lugs 17—17. The outer stop members 16—16 are in the form of reinforced angular members which are mounted on the inner surfaces of vertical leg portions 25—25 of the center sill structure 15 and the inner stop members 17—17 are in the form of vertically disposed plate members which extend inwardly from the inner surfaces of the vertical leg portions 25—25 of the center sill 15. The inner surfaces of the vertical leg portions 25—25 of the center sill 15 intermediate the outer and inner stop members 16—16 and 17—17, respectively, are provided, as is best illustrated in FIGURES 1a and 6, with center sill wear plates 18—18 for a reason which will be evident hereinafter.

In order to accommodate longitudinal movement of a horizontally disposed draft key 19, to be described in detail hereinafter, the outer ends of the vertical leg portions 25—25 of the center sill 15 are provided with horizontally aligned longitudinal slots 20—20 which are open at the outer end of the center sill 15. For obvious reasons, the outer stop members 16—16 are provided with similar longitudinal slots 21—21 in alignment with the slots 20—20. A pair of similarly slotted reinforcing plates 22—22 are provided on the outer surfaces of the vertical leg portions 25—25 of the center sill 15 for additional strengthening thereof.

In accordance with the present invention, a draft gear 23, which may be any one of the conventional types, is mounted in a standard A.A.R. yoke 24 with the draft gear 23 and the yoke 24 being movable, upon the application of buff forces thereto, longitudinally of the center sill 15 a distance which is approximately equal to the length of the standard A.A.R. pocket defined between the outer stop members 16—16 and the inner stop members 17—17. In the two illustrated forms of the invention, the draft gear 23 is a known type friction gear which with its follower is approximately equal in length to the length of the pocket and which is characterized by a casing 26 having a closed end defining a first integral end follower 27 and an open end from which a series of friction shoes 28 and an actuating wedge 29 therefor project. Spring elements (not shown) within the casing 26 normally urge the friction shoes 28 and the wedge 29 outwardly of the casing 26 and thus serve to resist inward movement of same.

A plate member separate from the casing 26 and defining a second end follower 31 is provided for engagement with the wedge 29 with the friction draft gear 23 being actuated in the usual manner upon relative movement of the two end followers 27 and 31 toward each other as a result of the application of buff and draft forces to the draft gear 23. For purposes of the present invention, a pair of outwardly directed transverse flanges or ears 32—32 are provided on the opposite sides of the draft gear casing 26 at or closely adjacent to the open end thereof, which ears act as a third integral follower which is disposed intermediate the first and second end followers 27 and 31. A series of angular gusset plates 33—33 are provided between the casing 26 and the follower ears 32—32 to further rigidify the latter.

The normal longitudinal spacing between the adjacent faces of the third follower 32 and the second end follower 31 less the distance the third follower 32 is spaced from the open end of the casing 26 when neither buff nor draft forces are applied to the draft gear 23, is equal to the full closure travel of the draft gear 23, which spacing is substantially less than the distance between the outer and inner stop members 16—16 and 17—17, respectively, which define the draft gear pocket. As the followers 31 and 32 of the novel draft gear 23 of the invention are engageable with the stop members 16—16 and 17—17, the draft gear 23 is adapted for bodily movement longitudinally of the center sill 15 through a distance which is approximately equal to the length of the draft gear pocket less the distance between the outer faces of the follower ears 32 and the inner face of the follower plate 31. For this reason, the second end follower 31 may be provided along the side edges of one of its faces with longitudinally extending ribs 34—34 to provide additional bearing and guide surfaces during longitudinal movement of the follower 31 between the center sill wear plates 18—18.

As described herein, one of the primary features of novelty of the specially designed draft gear of the present invention is the provision that the pair of followers thereof which are engageable, respectively, with the lugs or stop members defining the opposite ends of the draft gear pocket and which are movable longitudinally relative to each other upon closure of the draft gear are arranged such that the maximum longitudinal spacing therebetween is substantially less than the length of the draft gear pocket. Another primary feature of the invention is the provision of a long-travel cushion device, to be described in detail hereinafter, which is operably connected to the foregoing draft gear and which normally retains same in its outermost position whereby upon the application of the buff forces the cushion unit cooperates with the draft gear during the buff travel permitted by the foregoing follower arrangement to effectively cushion the buff forces applied thereto, which gear travel is substantially greater than that normally permitted draft gears of this type.

Because of the space limitations of the center sill and body bolster structure of the standard overhang railway car previously described herein, it is noted, as illustrated in the drawings, that the draft gear 23 is mounted in the center sill 15 with the open end of the casing 26 opening inwardly and with the separate follower plate 31 being disposed inwardly thereof. With this arrangement, the first end follower 27 serves as an outer end follower which is engageable by the inner end of the shank of a standard coupler member 36, with the second end follower 31 serving as an inner end follower and being engageable with the inner stop members 17—17 and with the intermediate follower 32 being engageable with the outer stop members 16—16. As will be described hereinafter, means are provided for normally retaining the draft gear 23 in a neutral outermost position with the intermediate follower 32 in abutting engagement with the outer stop members 16—16 and with the closed end of the draft gear casing 26 which defines the outer end follower 27 being disposed outwardly of the outer end of the center sill 15, as illustrated in FIGURES 1a and 1b. It is thus necessary for the normally heavy overhanging coupler member 36 to be adequately supported and a novel coupler carrier 38, to be described in detail hereinafter, is therefore provided. It is noted that if sufficient space were available in the center sill 15, the novel draft gear 23 could be assembled therein with its open end opening outwardly in the same manner that most standard draft gears are disposed in a car underframe.

The draft gear supporting yoke 24, which is of an A.A.R. standard design, is characterized by longitudinally extending, vertically spaced, upper and lower arms 39 and 40 between which the draft gear 23 is supportingly received, by a vertically extending connecting section or yoke butt 41 at the inner ends of the arms 39 and 40 which is disposed inwardly of the inner end follower plate 32 and is engageable with and by same, and by laterally spaced generally vertically disposed side wall sections 42—42 at the outer ends of the arms 39 and 40 between which the shank of the coupler member 36 extends. The previously mentioned horizontally disposed draft key 19 extends transversely through a slot 45 which is formed in the shank of the coupler member 36 and through slots 46—46 which are formed in the side wall sections 42—42 of the yoke 24, in horizontal alignment with the slot 45, to interconnect the coupler member 36 and the yoke 24 in the usual manner. The outer and inner edges of the key 19 are rounded as shown in the drawings. The slots 46—46 formed in the yoke 24 are provided with a greater width than the key 19 so that considerable "play" is present between the key 19 and the yoke 24. The slot 45 in the coupler shank, however, has a width which is only slightly greater than that of the key 19 whereby to permit a limited degree of lateral swinging movement of the coupler member 36 relative to the key 19. The yoke 24 is further characterized by a generally hemispherical seat member 48 having an inwardly directed externally threaded fastener portion 49 (FIGURES 1a and 4a) which is rigidly mounted, as by welding, on the yoke butt 41 for a purpose to be described hereinafter.

When draft forces are applied to the draft gear 23, assuming same to be in its normal outermost position, such forces are transmitted to the inner end follower plate 31 through the coupler member 36 and the yoke butt 41 in the usual manner with such draft forces being cushioned by closure of the draft gear 23, the closure travel of same being in the order of 2½ inches in the form of the invention illustrated in the drawings.

However, when buff forces are applied by the coupler member 36 to the outer end follower 27 of the draft gear 23, the draft gear being in its normal outermost position, the draft gear 23 is bodily moved inwardly of the center sill 15 until the inner end follower plate 31 abuts against the inner stop members 17—17, with the total inward movement of the draft gear 23 upon full closure of same being equal to the distance between the outer and inner stop members 16—16 and 17—17, that is, the length of the A.A.R. standard draft gear pocket, less the minimum spacing between the outer face of the intermediate follower 32 and the inner face of the follower plate 31 when the draft gear is fully closed. It is noted that the yoke 24 is simultaneously moved inwardly a distance equal to the inward movement of the draft gear 23 less the closure travel of same as a result of the engagement of the inner end follower plate 31 with the yoke butt 41.

An additional shock absorbing means is provided for cooperating with the draft gear 23 when buff forces are applied thereto and during the extended travel of same whereby to more effectively cushion heavy buff impacts. The substantially greater travel time and distance resulting from the foregoing system for cushioning buff forces in comparison with the more conventional shock absorbing systems provides super-cushioning characteristics and substantially reduces the shock forces on the car structure and lading. The long-travel, super-cushioning shock absorbing system of the present invention is therefore particularly well adapted for use on railway cars which are intended for transport of more fragile ladings. It is further noted that a railway car equipped with the foregoing long-travel shock absorbing or cushioning system offers a large measure of protection to adjacent cars as well as to itself during car impacts.

In the two forms of the invention illustrated in the drawings, the cooperating shock absorbing device is a large bore, long stroke hydraulic piston-and-cylinder cushion unit 51 which is mounted in the center sill 15 inwardly of and generally in alignment with the draft gear 23 and which is operably connected to the yoke 24 by a drive rod 52. The hydraulic cushion unit 51 is a conventional commercially available unit which is characterized by a generally cylindrical large bore housing 54 having an end cap configuration 55 at its closed end and a long stroke piston or ram 56 which projects from its opposite end and is normally biased into its substantially fully extended position by a known type air charged snubber chamber having a bleed back arrangement which is incorporated in the unit. As illustrated, the hydraulic cushion unit 51 is disposed in the center sill 15 with the outer end of its ram 56 directed toward the inner end of the yoke 24 with the drive rod 52 being connected to the yoke butt 41 to provide a force-transmitting connection therebetween.

In the form of the invention illustrated in FIGURES 1–8, the inner end of the drive rod 52 is rigidly connected to the end of the hydraulic cushion unit ram 56 in any suitable known manner and a universal swivel-type connection is provided between the outer end of the rod 52 and the yoke butt 41 whereby to accommodate any possible misalignment of the yoke 24 during inward movement thereof, as upon the application of buff forces to the draft gear 23. As best illustrated in FIGURES 1a and 4a, the outer end of the drive rod 52 is internally threaded and has an externally threaded socket member 58 threadedly tightened therein. The outer surface of the member 58 is provided with a generally hemispherical socket 59 which is complementary to the generally hemispherical seat member 48 which is secured on the yoke butt 41. A generally conically shaped bore 60 extends through the member 58 from the base of the conical seat 59 with the externally threaded fastener portion 49 of the hemispherical seat member 48 extending therethrough. The inner surface of the socket member 58 is provided with a convex spherical surface 61 and a washer 62 having a concave spherical face 63 complementary thereto is retained on the threaded fastener portion 49 of the seat member 48 by an internally threaded nut member 64. The foregoing structural arrangement provides a universal, ball and socket type connection between the yoke 24 and the outer end of the drive rod 52 which permits horizontal and vertical movement of the yoke 24 relative to the longitudinally aligned drive rod 52.

Because of the limited space between the inner end of a standard A.A.R. draft gear pocket and the adjacent body bolster in a standard overhang railway freight car of the type previously specified herein, the hydraulic cushion unit 51 of the form of the shock absorbing system of the invention illustrated in FIGURES 1-8, which system is incorporated in such a standard overhang car, is mounted in the center sill 15 inwardly of the body bolster. As best illustrated in FIGURES 1b, 4b and 7, the cylinder 54 is supported on a pair of longitudinally spaced cross ties or cradle-like carrier members 66—66 which are integrally secured to the cylinder 54, as by welding, and which have flanges 67—67 which extend beneath outwardly projecting lower flanges 68—68 of the center sill 15. A right-angular bottom tie strap 69 underlies each of the carrier members 66 with the carrier members 66—66 and the tie straps 69—69 being secured to the flanges 68—68 of the center sill 15 by conventional nut and bolt fasteners 70—70. A pair of reinforced right angular lugs or backstop members 71—71 are secured on the inner surfaces of the vertical leg portions 25—25 of the center sill 15 in abutting engagement with the cap end 55 of the hydraulic cylinder 54.

In this form of the invention, the drive rod 52, which is connected between the yoke 24 and the ram 56 of the hydraulic cushion unit 51 extends through a longitudinally disposed tubular guide member 73 which is rigidly mounted in the body bolster. The body bolster, which is conventional except for the guide 73, is characterized by a bolster center filler structure 74 including a series of transverse web or brace members 75—75, in which the guide member 73 is supported, and a series of longitudinally extending brace members 76—76, certain of which abut against the inner surfaces of the inner stop members 17—17. The body bolster structure is further characterized by a top plate 77 which overlies the upper surface of the center sill 15, by bottom plates 78, by a bottom tie plate 84 which underlies the center sill 15 and interconnects the bottom plate 78, and by a body center plate 79, with the foregoing body bolster structure being further characterized by a vertically disposed center bore 80 for receiving a king pin (not shown). The vertical leg portions 25—25 of the center sill 15 may be provided with a series of vertically and longitiudinally spaced elongated slots 81—81 to facilitate welding the various structural members of the body bolster.

A bottom closure plate 82 underlies the flanges 68—68 of the center sill 15 between the inner edges of the bolster bottom plates 78 and the outer end of the cylinder 54 of the hydraulic cushion unit 51 whereby to provide a closure for the portion of the normally open-bottom center sill 15 occupied by the piston ram 56 of the hydraulic cushion unit 51 when the ram is in its fully extended position, thus substantially reducing the accumulation of dust, dirt and other undesirable foreign material thereon.

The closure plate 82 is secured to the undersurfaces of the flanges 68—68 of the center sill 15 by conventional nut and bolt fasteners 83—83.

With the foregoing shock absorbing system, buff loads applied at the coupler 36 are transmitted both through the coupler shank to the draft gear 23 in the normal manner, as previously described herein, and through the follower plate 31, the yoke butt 41 and the drive rod 52 to the hydraulic cushion unit 51. After a predetermined amount of inward buff travel of the draft gear 23, during which travel the hydraulic cushion unit 51 provides hydraulic cushioning of the buff forces in cooperation with the cushioning effect afforded by the draft gear 23, the follower plate 31 abuts against the inner stop members 17—17 and prevents further cushioning closure of the hydraulic unit 51. Depending upon the relative resistance to closure afforded by the draft gear 23 and the hydraulic cushion unit 51, full closure of the draft gear 23 may occur either during the inward buff travel thereof prior to engagement of the follower plate 31 with the inner stop members 17—17 or immediately after engagement of the follower plate 31 with the inner stop members 17—17.

Figure 2:
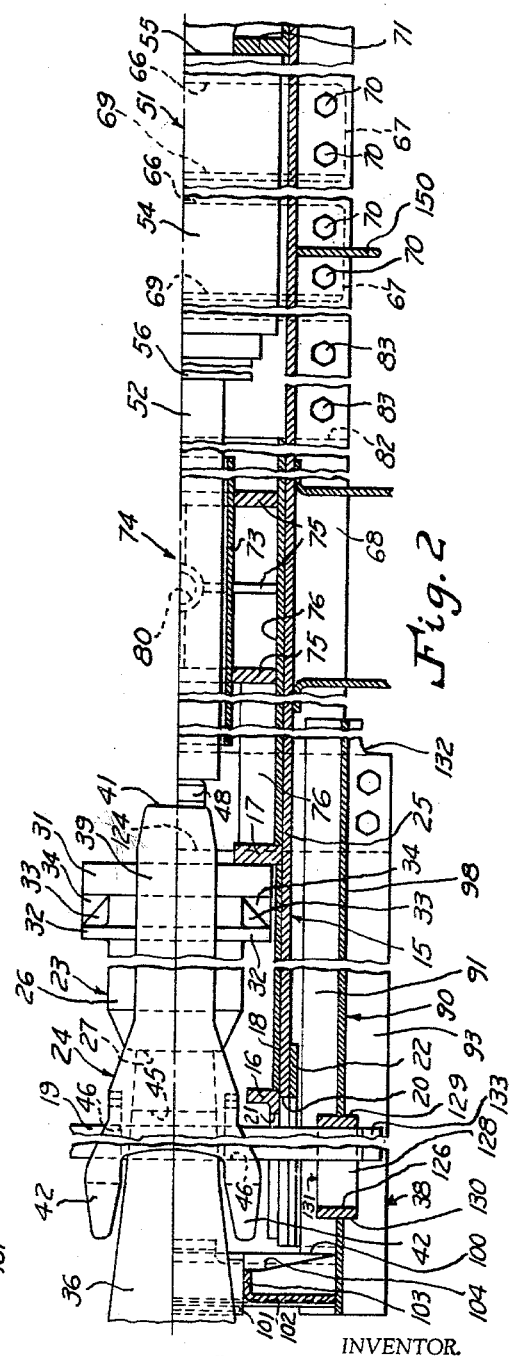
FIGURE 2 is a longitudinally broken top plan view similar to FIGURES 1a and 1b of the shock absorbing system thereof when full buff forces are applied thereto.

In the two forms of the invention illustrated in the drawings, wherein the draft gear pocket has a standard A.A.R. length of 24⅝", the hydraulic cushion unit is selected or designed to provide 17½" of inward buff travel which together with the 2½" closure travel for the draft gear 23 provides a full buff travel of 20" for this particular shock absorbing system. A full buff condition of the shock absorbing system of the invention is illustrated in FIGURE 2. This arrangement provides a high capacity shock absorbing system in buff, in the order of approximately 350,000 foot-pounds at a reaction of 300,000 pounds or approximately 583,000 foot-pounds at a reaction of 500,000 pounds. The foregoing capacities accommodate impact speeds, in the order of approximately 10 miles per hour and 12.9 miles per hour, respectively, which are substantially greater than the impact speeds accommodated by the substantially lower capacity standard draft gear riggings.

Draft forces applied at the coupler 36, when the draft gear 23 is in its neutral or normal outermost position, are absorbed solely by closure of the draft gear 23 in the usual manner as previously described herein. With a draft gear closure of 2½", it is noted that during closure of the draft gear 23, upon the application of draft forces to the coupler 36, provision must be made to accommodate 2½" of outward movement of the ram 56 of the hydraulic cushion unit 51 from its normal or neutral position. Thus, the unit 51 must have a total ram travel of at least 20" whereby to accommodate 17½" of buff travel and 2½" of draft travel. When the hydraulic cushion unit 51 is installed in the center sill 15, it is therefore precompressed sufficiently to permit 2½" of outward or draft travel of the ram 56 from its normal or neutral position.

In the event of a load reversal from either full or partial buff to draft, the air-bleed characteristics of the hydraulic cushion unit 51, which normally serve to return the piston ram 56 thereof to its neutral position from its full buff position, provide a snubbing or resistance effect somewhat similar to that of a light-weight draft gear until the intermediate follower 32 engages the outer stop members 16—16, at which point the draft gear 23 becomes fully operable to perform its normal draft function. The snubbing action of the hydraulic cushion unit 51 prevents the intermediate follower 32—32 from violently impacting the outer stop members 16—16. The draft gear 23 is closed as a result of the draft forces transmitted to the follower plate 31 by the yoke butt 41. A full draft condition of the shock absorbing system of the invention is illustrated in FIGURE 3.

The previously referred to coupler carrier 38 for supporting the coupler member 36, which normally overhangs the outer end of the center sill 15, may best be described with reference to FIGURES 1a, 4a, 5 and 6. For supporting the coupler carrier 38, a pair of right angular elongated beam members 86—86 are rigidly mounted, as by welding, on the outer surfaces of the vertical leg portions 25—25 of the center sill 15 above the reinforcing plates 22—22, which beam members extend from the outer end of the center sill 15 inwardly to a point near the inner stop members 17—17. Each beam member 86 is characterized by a vertically disposed leg portion 87 which is secured against the appropriate vertical leg portion 25 of the center sill 15 and by an outwardly projecting horizontally disposed flange portion 88 at the lower end thereof, which latter portions of the members 86—86 are spaced above and extend parallel to the outwardly directed lower flanges 68—68 of the center sill 15.

The coupler carrier 38 includes a pair of elongated channel members 90—90 which are disposed one along each side of the center sill 15 with each channel member 90 being characterized by an inwardly directed flange portion 91 at its lower edge which is slidably supported on the upper surface of one of the flanges 68 of the center sill 15 and by an inwardly turned flange portion 92 at its upper edge which is slidably supported on the upper surface of the horizontally disposed flange portion 88 of one of the beam members 86 whereby the beam members 90—90 are longitudinally slidable relative to the fixed center sill 15. The lower edges of the channel members 90 are also provided with outwardly directed flange portions 93—93.

A series of three angular brackets 94—94 (FIGURES 6 and 8) are provided on each side of the center sill 15 for guidingly retaining the upper flanges 92—92 of the beam members 90—90 in proper relationship to the horizontal flange portions 88—88 of the beam members 86—86. Each bracket 94 is characterized by a vertically disposed portion 95 which is secured, as by welding, against the vertical leg portion 87 of one of the beam members 86, by a portion 96 which extends horizontally outwardly from the lower edge of the portion 95 in spaced relationship slightly above the upper flange portion 92 of the associated channel member 90, and by a vertically disposed portion 97 which extends downwardly from the outer end of the horizontally disposed portion 96 in outwardly spaced relationship to the upper edge of the channel member 90.

As will now be described, the two slidably mounted channel members 90—90 are interconnected for simultaneous movement longitudinally of the center sill 15. The outer ends of the channel members 90–90 are interconnected by a transversely extending inverted U-shaped coupler carrier support member 100 which is supported at its opposite ends on the inwardly directed lower flanges 91–91 of the channel members 90–90. An inverted U-shaped wear plate 101 is fixedly mounted on the central portion of the coupler carrier support member 100 and is adapted to support on its upper surface the shank of the coupler member 36. A pair of transversely aligned and vertically disposed end plates 102-102 are mounted on the coupler carrier support member 100, on opposite sides of the wear plate 101 and along the outer edge of the support member 100, with their outer vertical edges being secured against the inner surfaces of vertical web portions 98–98 of the channel members 90–90 and with their inner edges being characterized by inwardly turned flanges 103–103 which abut, at their lower ends, the opposite ends of the wear plate 101. The outer portions of the upper edges of the end plates 102–102 are secured to the undersurfaces of the inwardly directed upper flanges 92-92 of the channel members 90–90. The end plates 102–102 may also be provided on their inner surface with a series of vertically spaced horizontally disposed strengthening ribs 104–104, the opposite ends of which are secured, respectively, to the inwardly turned flanges 103–103 thereof and to the inner surfaces of the vertical web portions 98–98 of the channel members 90–90.

A transversely extending brace member or top bridge plate 106 interconnects the upper portions of the outer ends of the channel members 90–90 with its opposite ends being fixedly supported on the upper surfaces of the inwardly directed upper flanges 92–92 of the channel members 90–90. The central portion of the bridge plate 106 is angularly offset in an upward direction, as at 107, whereby same extends slightly above the upper surface of the shank of the coupler member 36 and thus serves as a restraint against excessive vertical movement of the coupler member 36. It is noted that the end plates 102–102 may extend upwardly until same overlap the outer edges of the top bridge plate 106. A top cover plate 110 has an outer edge portion 111 secured to the upper surface of the upwardly offset portion 107 of the bridge plate 106 and an inwardly extending upwardly offset portion 112 which overlies the upper arm 39 of the yoke 24 and extends a short distance inwardly of the center sill 15.

The channel members 90–90 are also interconnected approximately midway between their outer and inner ends by a transversely extending inverted U-shaped brace member 114, the opposite ends of which are secured to the undersurfaces of the outwardly turned lower flanges 93–93 of the channel members 90 by conventional nut-and-bolt fasteners 115–115. As best illustrated in FIGURE 6, spacer blocks 116–116 are provided between the ends of the brace member 114 and the flanges 93-93 to provide sufficient clearance between the brace member 114 and the flanges 68–68 of the center sill 15 to permit longitudinal movement of the coupler and yoke carrier 38 relative to the center sill 15. A transversely extending yoke carrier wear plate member 117 having upturned side edges 118-118 (FIGURE 6) is secured on the upper surface of the brace member 114 intermediate the vertical leg portions 25–25 of the center sill 15 for supporting the yoke 24. The upturned side edges 118–118 of the yoke carrier member 117 are spaced outwardly of the side edges of the lower arm 40 of the yoke 24 whereby to define therebetween a pair of laterally spaced longitudinally extending guideways 119-119 (FIGURE 6) which are adapted to receive a pair of laterally spaced longitudinally extending guide ribs 120—120 which are provided on the underside of the draft gear casing 26. The foregoing structural arrangement provides lateral stabilization of the draft gear 23 and the yoke 24 during longitudinal movement thereof. The yoke 24 is further laterally stabilized by a pair of elongated angular guide members 121—121 (FIGURES 4a and 6) which are mounted in the upper corners of the center sill 15 for laterally guiding the upper arm 39 of the yoke 24.

The inner ends of the channel members 90—90 are interconnected by a transversely extending U-shaped brace member 124 which has its opposite ends secured to the two channel members 90—90 in generally the same manner that the brace member 114 is secured thereto.

Provision is made for interconnecting the coupler and yoke carrier 38 to the draft key 19 to provide a motion-transmitting relationship therebetween with such connection preferably being a lost-motion connection wherein, during the application of buff forces, inward movement of the coupler carrier 38 lags behind the inward movement of the coupler member 36, the draft gear 23 and the yoke 24, whereby to provide an additional degree of support for the overhanging coupler member 36 during the application of buff forces thereto. A pair of aligned, longitudinally extending rounded-end slots 126—126 are provided in the channel members 90—90, adjacent the outer ends thereof, for receiving the opposite ends of the draft key 19. Each slot 126 is defined by a fabricated or cast-flattened oval member 131 having a pair of parallel vertically spaced upper and lower wall portions 127 and 128, respectively, and by a pair of rounded end portions 129 and 130, respectively, with the members 131 being secured in suitable openings formed in the channel members 90—90. The width of the slots 126—126 is greater than the width of the draft key 19 whereby to provide the aforementioned lost-motion connection which results in the lag in the inward movement of the coupler carrier 38 relative to the coupler member 36 during the application of buff forces thereto. Suitable head means 133—133 are provided on the opposite ends of the key 19 outwardly of the slots 126—126. As illustrated in FIGURE 2, during the application of buff forces, the inner edge of the draft key 19 engages the inner ends 129—129 of the slots 126—126 whereas, during the application of draft forces, as illustrated in FIGURE 3, the outer edge of the draft key 19 engages the outer ends 130—130 of the slots 126—126. For example, in the form of the invention illustrated in FIGURES 1-8 wherein the total buff travel of the coupler member 36 and the draft gear casing 26 is 20 inches, the extended widths of the coupler slot 45 and the carrier slots 126 relative to the width of the draft key 19 combine to provide a lag of 4 inches in the inward movement of the coupler carrier 38 whereby the total travel of same in buff is 16 inches, thus providing a greater overlap of the carrier 38 on the center sill 15 without any interference between the carrier flanges 93 and the bolster bottom plates 78 in full buff.

As illustrated in FIGURES 1a, 2 and 3 the inner ends of the outwardly directed lower flanges 93—93 of the channel members 90 are cut away, as at 132, so that there will be no interference by the inner ends of the channel members 90—90 with portions of the body bolster structure when the coupler and yoke carrier 38 is moved into its innermost position. A pair of angular brackets 134—134 FIG. 1a are secured to the undersurfaces of the flanges 68—68 of the center sill 15 at the outer ends thereof, which brackets define coupler carrier draft stops which are engageable by the cross brace member 114 whereby to limit outward movement of the coupler and yoke carrier 38.

As best illustrated in FIGURES 1a and 1b, provision is made for utilizing a novel floating air brake train line arrangement with the shock absorbing system described herein. Briefly, this arrangement includes a non-flexible outer end train line portion 136 which is mounted on one side of the coupler carrier 38 for floating movement therewith and a flexible train line portion 137 which is disposed inwardly of the outer end portion 136 and has its inner end mounted rigidly with respect to the center sill 15. The outer end of the non-flexible train line portion 136 is supported by an angle cock bracket 138 which is characterized by a vertically disposed longitudinally extending portion 139 which is secured at its inner end to the outer face of the vertical leg portion or web 98 of the channel member 90 at the outer end thereof with the portion 139 projecting outwardly thereof and terminating in an outwardly bent transverse vertically disposed portion 140. The angle cock bracket 138 is further characterized by a horizontally disposed portion 141 which projects outwardly from the lower edge of the portion 140, the outer end of the non-flexible train line portion 136 being secured to the underside of the horizontally disposed portion 141 of the bracket 138.

At a point spaced inwardly of its outer end, the non-flexible train line portion 136 is rigidly clamped to the inner end of the coupler carrier 38 by means of a conventional commercially available clamp device 144 which is suitably mounted on the inner end of the appropriate channel member 90. The portion of the non-flexible train line 136 that extends past the body bolster structure is slidably supported in a guide sleeve 146, which guide sleeve is mounted between longitudinally spaced vertically disposed and transversely extending web portions 147—147 of the bolster structure. The inner end of the non-flexible train line portion 136 is slidably supported in a cylindrical bearing sleeve 149 which is mounted in a transversely extending vertically disposed cross tie portion 150 which is rigidly attached to the center sill 15 adjacent the outermost transversely extending cushion unit support member 69.

The inner end of the non-flexible train line portion 136 is connected by a conventional coupling device 152 to the outer end of the flexible train line portion 137, with the inner end of the flexible train line portion 137 being connected to the balance of the usual non-flexible air brake train line 153 which extends longitudinally of the central portion of the railway car by a conventional coupling device 154. A portion of the coupling device 154 is rigidly mounted in a vertically disposed portion 155 of a cross bearer member 156 which is disposed inwardly of the inner end of the hydraulic cushion unit 51.

The flexible portion 137 of the train line permits longitudinal floating movement of the non-flexible outer train line portion 136 with the coupler carrier 38 relative to the rigid center sill 15. It is noted that in the normal neutral position of the coupler carrier 38, as illustrated in FIGURE 1a, the coupling device 152 between the non-flexible and flexible train line portions 136 and 137, respectively, is spaced inwardly of the cylindrical bearing sleeve 149 a distance which is sufficient to accommodate outward movement of the coupling device 152 with the non-flexible train line portion 136 upon the application of draft forces to the coupler member 36 without the coupling device 152 engaging and its outward movement being interferred with by the cylindrical bearing sleeve 149. If necessary, the non-flexible floating train line portion 136 may be appropriately bent so that its movement will not be interferred with by existing car structure, such as the body bolster.

Two additional structural arrangements for connecting the outer end of the hydraulic cushion unit drive rod 52 to the yoke butt 41 are illustrated in FIGURES 10 and 11 and in FIGURES 12 and 13, respectively. The arrangement illustrated in FIGURES 10 and 11 permits both vertical pivoting movement of the yoke butt 41 relative to the drive rod 52 and limited lateral movement of the yoke butt 41 relative to same. An externally threaded plug member 160 having an outwardly projecting narrowed neck portion 161 is tightened in the internally threaded outer end of the drive rod 52 so that the narrowed neck portion 161 is disposed vertically. A pair of identical fastener connectors 162—162 are pivotally mounted against opposite side surfaces of the vertical neck portion 161 of the plug member 160 by means of a transversely extending pivot bolt 164 which extends through the two fastener connectors 162—162 and the neck portion 161 of the plug member 160. Each of the fastener connectors 162 is further characterized by a pair of vertically spaced inwardly directed nose portions 165—165 having tapered configurations, which nose portions 165—165 are spaced from the pivotally mounted portions of the fastener connectors 162—162. The nose portions 165—165 of the fastener connectors 162—162 are adapted to be received in vertically spaced tapered recesses 166—166 which are formed on each side of the yoke butt 41 whereby to connect the drive rod 52 to yoke butt 41 in a manner permitting limited lateral movement of the yoke 24 relative to the drive rod 52. The pivotal mounting of the fastener connectors 162—162 on the pivot bolt 164 permits pivoting movement of the yoke butt 41 in a vertical direction relative to the drive rod 52.

The structural arrangement illustrated in FIGURES 12 and 13 provides a rigid connection between the yoke butt 41 and the drive rod 52. As illustrated, a connector 168 is secured to the yoke butt 41, as by welding, and is provided with an inwardly projecting externally threaded end portion 169 which is threadedly tightened in the internally threaded outer end of the drive rod 52 to provide a force-transmitting connection between the yoke 24 and the cushion unit 51.

The foregoing shock absorbing system for a standard overhang railway car, as illustrated in FIGURES 1–8, provides a super-cushioning arrangement which has been found capable of protecting both the car structures and the car lading and which also maintains its own structural integrity under severe impact conditions. Under buff or impact conditions, the foregoing shock absorbing system has approximately 350,000 foot-lbs. of capacity at a reaction of 300,000 lbs. and approximately 583,000 foot-lbs. of capacity at a 500,000 lb. reaction level, which capacities are substantially greater than that of standard friction draft gears which have an average capacity of approximately 23,000 foot-lbs. at a reaction of 350,000 lbs. Assuming impact between two fully loaded 70-ton railway cars, the foregoing shock absorbing system on one of such cars would accommodate impact speeds of approximately 10.00 miles per hour and 12.9 miles per hour, respectively, at the above mentioned reaction levels. This super-cushioning system not only affords a greater measure of protection to its own car structure and lading but also to the structure and lading of adjacent cars during switching impacts.

Under draft conditions, the foregoing shock absorbing system has a capacity of approximately 23,000 foot-lbs. at a reaction of 350,000 lbs. which is approximately the average of A.A.R. standard friction gears.

It is further noted that the super-cushioning shock absorbing system described herein, which utilizes standard car couplers and yokes and A.A.R. standard length draft gear pockets, is readily applicable to existing and standard railway cars with a minimum of structural modification being required. Such modifications include removal of the usual striker plate, modifying the standard fabricated or cast bolster center filler so as to permit mounting the drive rod guide sleeve 73 therein, attaching the desired drive rod connector to the butt of a standard yoke, and providing the necessary support members for the cushion unit 51, the coupler carrier 38, and the floating train line 136.

In the event of failure of the hydraulic cushion unit 51, the car need not be considered fully disabled pending repair or replacement of the hydraulic cushion unit as the novel draft gear 23 may be blocked in its innermost position, while fully open, with same then being operable to provide normal cushioning upon the application of both buff and draft forces thereto.

The super-cushioning shock absorbing system of the present invention has been described thus far herein, with reference to FIGURES 1–8, primarily to the installation of same in a railway car having a standard underframe with an overhang of 5'-6" from the center line of the body bolster to the outer surface of the usual striker plate. As illustrated in FIGURES 9a and 9b, the super-cushioning shock absorbing system of the invention may also be incorporated in railway cars having a greater than standard underframe length, such as "Trailer Train" cars which have an overhang of 11'-10" from the center line of the body bolster to the outermost end of the underframe structure. In such an installation, because of the greater distance between the standard draft gear pocket and the body bolster structure, the hydraulic cushion unit may be mounted in the center sill between the draft gear pocket and the body bolster structure and may be connected to the yoke butt by a short drive rod, thus eliminating the necessity of modifying the bolster center filler to permit passage of the drive rod therethrough, as in the installation described with reference to FIGURES 1–8.

Referring now to FIGURES 9a and 9b, the underframe of the long overhang railway car is characterized by a stationary center sill 170 which is of inverted U-shaped configuration and which includes laterally spaced vertical leg portions 171—171 having outwardly directed flange portions 172—172 at the lower ends thereof, by a draft gear pocket having a standard A.A.R. length of 24⅝ inches, which pocket is defined by outer stop members or draft lugs 173—173 and inner stop members or buff legs 174—174 which are mounted on the inner surfaces of the vertical leg portions 171—171 of the center sill 170, and by a bolster center filler 175 which is disposed a substantial distance inwardly of the draft gear pocket and which includes a vertically disposed bore 176 for receiving the usual king pin (not shown).

A friction draft gear 178 similar to the draft gear 23 of the first described embodiment of the invention is mounted in a standard yoke 179 for longitudinal movement relative to the stationary center sill structure 170. The draft gear 178 is characterized by a casing 180 which is disposed in the center sill 170 with its closed end disposed outwardly thereof and defining an outer end follower 181 which is engageable by the shank end of a coupler member 183 having a long shank 182. A separate inner end follower plate 184, which may be provided with guide ribs 185—185, is disposed at the inner end of the yoke 179 and is adapted for engagement with a protruding actuating element 186 of the draft gear 178 for closing same in the usual manner when buff and draft forces are applied by the coupler member 183. The draft gear casing 180 is provided near its inner open end with a pair of reinforced laterally extending side flanges or ears 188—188 which define an intermediate follower which is normally engageable with the outer stop members 173—173, with the major portion of the draft gear casing 180 projecting outwardly of the pocket defined between the outer and inner stop members 173—173 and 174—174, respectively. Upon the application of buff forces, the inner end follower plate 184 is adapted to abut against the inner stop members 174—174.

The standard yoke member 179 is characterized by upper and lower arms 190—190 and by a vertically disposed butt section 191 which interconnects the inner ends thereof. The outer ends of the yoke arms 190—190 are connected to the shank 182 of the coupler member 183 by a vertically disposed pivot pin 192 whereby to permit lateral pivoting movement of the coupler member 183 relative to the yoke 179.

In this form of the invention, a hydraulic piston-and-cylinder cushion unit 194 is mounted in the center sill structure 170 between the draft gear pocket and the bolster center filler structure 175. The hydraulic cushion unit 194, which is of a conventional type similar to the hydraulic cushion unit 51 of the first-described embodiment of the invention, is characterized by a cylinder 195, by a ram or piston 196 and by an air-bleed arrangement (not shown) which serves both to return the ram 196 to its substantially fully extended position after inward movement of same and to normally retain the ram 196 in its substantially fully extended position. A pair of reinforced angular backstop members 197 are provided on the center sill structure 170 for engagement with the inner end of the cylinder 195. The hydraulic cushion unit cylinder 195 is supported on a pair of longitudinally spaced transversely extending cradle-like support members 198—198 which are integrally secured to the cylinder 195, as by welding, and which are attached in a suitable manner to the undersurfaces of the outwardly directed lower flanges 172—172 of the center sill structure 170. The outer end of the hydraulic cushion unit ram 196 is connected to the inner end of a short drive rod 200 which has its outer end connected to the yoke 179 by means of a suitable connector 201 which is secured to the yoke butt 191.

A pair of center sill wear plates 187—187 are provided on the inner surfaces of the vertical leg portions 171—171 of the center sill structure 170 between the outer and inner stop members 173—173 and 174—174, respectively, for guiding the longitudinal movement of the inner end follower plate 184 and the ears 188—188 on the draft gear casing 180 which define the intermediate follower plate.

As in the first-described embodiment of the invention, when buff forces are applied to the coupler member 183, such buff forces are transmitted both to the outer end follower 181 of the draft gear 178 by the coupler member 183 and to the hydraulic cushion unit ram 196 through the yoke 179 and the drive rod 200. Under full buff conditions, the buff forces are cushioned by closure of both the series-connected hydraulic cushion unit 194 and the draft gear 178, the combined closure being a long travel closure which approximates the length of the draft gear pocket whereby to provide, as previously set forth herein, a shock absorbing system having a substantially high capacity under buff or impact conditions.

In draft, assuming the foregoing system to be in its neutral or normal condition, draft forces are absorbed solely by the draft gear 178 in the usual manner with the closure travel of the draft gear being relatively short in comparison with the foregoing closure travel thereof under buff conditions. To accommodate outward movement of the drive rod 200 with the yoke 179 during the application of draft forces, the hydraulic cushion unit 194 is correspondingly pre-compressed in its neutral position. If the coupler member 183 is suddenly subjected to a draft force from a partial or full buff condition, the air-bleed characteristics of the hydraulic cushion unit 194 provide a snubber or light draft gear action which prevents the intermediate follower 188—188 of the draft gear 178 from violently impacting the outer stop members 173—173.

As illustrated in FIGURE 9a, this embodiment of the invention is also characterized by a coupler and yoke carrier 203 which is somewhat similar in structure and operation to the coupler and yoke carrier 38 of the first-described embodiment of the invention. The coupler carrier 203 includes a pair of elongated channel members 204—204 which, although not fully illustrated in FIGURE 9a, are slidably mounted on opposite sides of the center sill structure 170 in the same manner that the channel members 90—90 of the coupler carrier 38 are mounted on the center sill structure 15 in the first-described embodiment of this invention. Each channel member 204 is characterized by a vertical web portion 206 having inwardly and outwardly directed flange portions 207 and 208, respectively, at its edge.

The outer ends of the channel members 204—204 are interconnected by a generally U-shaped rigid structure 210 which is adapted for supporting a portion of the coupler member 183. The U-shaped supporting structure 210 is characterized by longitudinally extending leg portions 211—211 which are rigidly mounted at their inner ends on the outer ends of the inwardly directed lower flanges 207—207 of the channel members 204—204 and by a transversely extending base portion 212 which is spaced outwardly of the outer ends of the channel members 204—204 and which is adapted for supporting, in a suitable manner, the outer portion of the shank 182 of the coupler member 183. It is noted that the transverse portion 212 is provided with a wide throat, as at 213, which permits normal lateral swinging movement of the coupler member 183 on curves.

The inner ends of the channel members 204—204 are interconnected by a cross brace member 215 which is suitably connected to the undersurfaces of the outwardly directed lower flanges 208—208 of the channel members 204—204. The yoke 179 and the draft gear 178 are suitably supported by transversely extending supporting structures 217 and 219 which are located intermediate the opposite ends of the channel members 204—204 and which are similar in structure to the yoke and draft gear supporting structure 114-117 of the first-described embodiment of the invention, as best illustrated in FIGURE 6. The supporting structures 217 and 219 are secured in a suitable manner to the undersurfaces of the outwardly directed lower flanges 208—208 of the channel members 204—204.

In the form of the invention illustrated in FIGURE 9a, the coupler and yoke carrier 203 may be operatively connected to the coupler member 183, the yoke 179, or the draft gear 178 for positive movement therewith or by means of a suitable lost-motion connection as in the first-described embodiment of the invention. Although not illustrated in the drawings, the coupler carrier 203 in FIGURE 9a is connected to the draft gear 178 for positive longitudinal movement therewith by means of upwardly directed lugs (not shown) which are mounted on the transversely extending supporting structure 217 and which embrace the lower edges of the laterally extending ears 188—188 provided on the draft gear 178.

The foregoing structural arrangement provides adequate support for the overhanging long-shank coupler member 183 during the long-travel longitudinal movement thereof upon the application of buff forces thereto.

The long-travel super-cushioning shock absorbing systems disclosed herein for incorporation in railway freight cars provide such effective cushioning upon the application of buff forces to car couplers that fragile ladings are protected without the necessity of using elaborate deck cushioning arrangements, such as those commonly used on fifth-wheel stands, sliding racks, and elastic tie-downs. It is further noted that these shock absorbing systems do not lessen the ability of the railway cars in which they are installed to negotiate short radius curves but rather permit negotiation of curves of the same radius that could be negotiated by similar cars equipped with standard draft gear riggings.

The new and novel super-cushioning shock absorbing arrangement of the present invention is not intended to be limited solely to systems utilizing serially connected friction-type draft gears and hydraulic units, as illustrated in the drawings, as other known-type draft riggings modified to incorporate the herein described follower arrangement may be substituted for the illustrated friction-type draft gear and other known-type long-travel cushioning devices may be substituted for the illustrated hydraulic unit.

Since additional changes can be made in the foregoing structural arrangements and still different embodiments of the invention can be made without departing from the spirit and scope thereof, it is intended that all matters shown in the accompanying drawings and described hereinbefore shall be interpreted as illustrative and not in a limiting sense.

What is claimed as new is:

1. In a railway car having a longitudinally extending stationary center sill with an open outer end, the combination of a coupler carrier slidably mounted on said outer end of said center sill for longitudinal movement relative thereto, coupler means supportable by said coupler carrier, first shock absorber means mounted in said center sill for longitudinal movement relative thereto through a distance approximately equal to the length thereof, said first shock absorber means being operatively associated with said coupler means to cushion buff and draft forces applied thereto, hydraulic shock absorber means mounted in said center sill and operatively associated with said first shock absorber means in a manner such that said hydraulic shock absorber means operates with said first shock absorber means in cushioning buff forces applied to said coupler means during said longitudinal movement of said first shock absorber means, and a motion-transmitting connection between said coupler means and said coupler carrier.

2. The combination recited in claim 1 wherein said motion-transmitting connection between said coupler means and said coupler carrier comprises a lost-motion connection adapted to provide both a predetermined lag in the longitudinal movement of said coupler carrier relative to that of said coupler means when buff forces are applied to said coupler means and simultaneous longitudinal movement of said coupler carrier with said coupler means when draft forces are applied thereto.

3. In a railway car having a stationary center sill with a draft gear pocket defined in the open outer end thereof by longitudinally spaced inner and outer stop members, the combination of a draft gear for said pocket having an over-all length approximately equal to the length of said pocket, and a pair of relatively movable inner and outer followers associated with said draft gear and engageable, respectively, with said inner and outer stop members, which followers are normally longitudinally spaced apart a distance which is approximately equal to the maximum closure travel of said draft gear when buff and draft forces are applied thereto and which is substantially less than the length of said pocket, said draft gear normally being disposed in its outermost position relative to said pocket with said outer follower disposed against said outer stop members, whereby upon the application of buff forces thereto said draft gear is movable inwardly of said center sill to engage said inner follower against said inner stop members through a distance which is approximately equal to the length of said pocket.

4. In a railway car having a stationary center sill with a draft gear pocket defined in the open outer end thereof by longitudinally spaced inner and outer stop members, the combination of a draft gear for said pocket having an overall length approximately equal to the length of said pocket, a pair of relatively movable inner and outer followers associated with said draft gear and engageable, respectively, with said inner and outer stop members, which followers are normally longitudinally spaced apart a distance which is approximately equal to the maximum closure travel of said draft gear when buff and draft forces are applied thereto and which is substantially less than the length of said pocket, said draft gear normally being disposed in its outermost position relative to said pocket with said outer follower disposed against said outer stop members, whereby upon the application of buff forces thereto said draft gear is movable inwardly of said center sill to engage said inner follower against said inner stop members through a distance which is approximately equal to the length of said pocket, and a long-travel shock absorber device operably associated with said draft gear and adapted to cooperate therewith in cushioning buff forces applied thereto during said inward movement of said draft gear.

5. The combination recited in claim 4 wherein said cooperating long-travel shock absorbing device comprises a hydraulic cushion unit which is mounted in said center sill inwardly of said draft gear pocket.

6. In a railway car having a stationary center sill with a draft gear pocket defined in the open outer end thereof by longitudinally spaced inner and outer stop members, the combination of a draft gear for said pocket which is characterized by a casing having relatively movable actuating means normally projecting from one end thereof, said draft gear being disposed in said pocket with said actuating means thereof projecting inwardly of said center sill, first follower means disposed inwardly of said draft gear for actuating engagement with said relatively movable actuating means thereof and for engagement with said inner stop members, and second follower means formed on the inner end of said draft gear casing and adapted for engagement with said outer stop members with the maximum spacing between said first and second follower means being substantially less than said longitudinal spacing between said inner and outer stop members, said draft gear being normally disposed in its outermost position with said second follower means in engagement with said outer stop members and with a major portion of said draft gear casing projecting outwardly of said pocket beyond said outer stop members, said arrangement of parts being such that said draft gear casing is bodily movable inwardly of said center sill upon the application of buff forces thereto a distance which, at full closure of said draft gear, is approximately equal to the spacing between said inner and outer stop members less the minimum spacing between said first and second follower means.

7. In a railway car having a stationary center sill with a draft gear pocket defined in the open outer end thereof by longitudinally spaced inner and outer stop members, the combination of a draft gear for said pocket which is characterized by a casing having relatively movable actuating means normally projecting from one end thereof, said draft gear being disposed in said pocket with said actuating means thereof projecting inwardly of said center sill, first follower means disposed inwardly of said draft gear for actuating engagement with said relatively movable actuating means thereof and for engagement with said inner stop members, second follower means formed on the inner end of said draft gear casing and adapted for engagement with said outer stop members with the maximum spacing between said first and second follower means being substantially less than said longitudinal spacing between said inner and outer stop members, said draft gear being normally disposed in its outermost position with said second follower means in engagement with said outer stop members and with a major portion of said draft gear casing projecting outwardly of said pocket beyond said outer stop members, said arrangement of parts being such that said draft gear casing is movable inwardly of said center sill upon the application of buff forces thereto a distance which, at full closure of said draft gear, is approximately equal to the spacing between said inner and outer stop members less the minimum spacing between said first and second follower means, and separate shock absorber means operably associated with said draft gear and adapted to cooperate therewith in absorbing buff forces applied thereto during said inward movement of said draft gear casing.

8. The combination recited in claim 7 wherein said separate cooperating shock absorbing means comprises a hydraulic cushion unit which is mounted in said center sill inwardly of said draft gear pocket.

9. In a railway car having a stationary center sill with a draft gear pocket defined in the open outer end thereof by longitudinally spaced inner and outer stop members, the combination of a draft gear for said pocket having an over-all length approximately equal to the length of said pocket, a pair of relatively movable inner and outer followers associated with said draft gear, which followers are normally longitudinally spaced apart a distance which is approximately equal to the maximum closure travel of said draft gear when buff and draft forces are applied thereto and which distance is substantially less than the distance between said inner and outer stop members, interconnected coupler and yoke means for applying buff and draft forces to said draft gear, a coupler carrier slidably mounted on said stationary center sill and having a portion disposed outwardly of the outer end of said center sill for supporting said coupler means, said draft gear normally being disposed in its outermost position relative to said pocket with said outer follower disposed against said outer stop members, whereby upon the application of buff forces thereto said draft gear is movable inwardly of said center sill until said inner follower abuts against said inner stop members through a distance which is approximately equal to the length of said pocket, separate shock absorber means operably associated with said draft gear and adapted to cooperate therewith in cushioning buff forces applied thereto during said inward movement of said draft gear, and a motion-transmitting connection between said coupler means and said coupler carrier.

10. In a railway car having a stationary center sill with a draft gear pocket disposed outwardly of a body bolster and being defined by longitudinally spaced inner and outer stop members, the combination of a draft gear for said pocket having an over-all length approximately equal to the length of said pocket, a pair of relatively movable inner and outer followers associated with said draft gear, which followers are normally longitudinally spaced apart a distance which is approximately equal to the maximum closure travel of said draft gear when buff and draft forces are applied thereto and which distance is substantially less than the distance between said inner and outer stop members, interconnected coupler and yoke means for applying buff and draft forces to said draft gear, said draft gear normally being disposed in its outermost position relative to said pocket with said outer follower disposed against said outer stop members, whereby upon the application of buff forces thereto said draft gear is movable inwardly of said center sill until said inner follower abuts against said inner stop members through a distance which is approximately equal to the length of said pocket, a normally extended hydraulic piston-and-cylinder cushion unit mounted in said center sill inwardly of said draft gear pocket, and a force-transmitting member connected between the inner end of said yoke means and the piston of said hydraulic cushion unit whereby said unit is adapted to cooperate with said draft gear in cushioning buff forces applied thereto during said inward movement of said draft gear between said inner and outer stop members.

11. The combination recited in claim 10 wherein said connection between the inner end of said yoke means and said force-transmitting member comprises a swivel-type connection.

12. The combination recited in claim 10 wherein said hydraulic cushion unit is mounted in said center sill inwardly of said body bolster, wherein a longitudinally extending cylindrical guide tube is provided in said body bolster, and wherein said force-transmitting member extends through said guide tube for longitudinal movement relative thereto.

13. The combination recited in claim 10 wherein said hydraulic cushion unit is mounted in said center sill between said draft gear pocket and said body bolster.

14. In a railway car having a stationary center sill with a draft gear pocket disposed outwardly of a body bolster and being defined by longitudinally spaced inner and outer stop members, the combination of a friction draft gear for said pocket which is characterized by a casing portion and a friction clutch portion which normally projects from one end thereof, said draft gear being disposed with its friction clutch portion projecting inwardly of the center sill, a first follower disposed inwardly of said draft gear casing for actuating engagement with said friction clutch portion thereof and for engagement with said inner stop members, a second follower formed on the inner end of said draft gear casing and adapted for engagement with said outer stop members with the maximum spacing between said first and second followers being substantially less than said longitudinal spacing between said inner and outer stop members, interconnected coupler and yoke means for applying buff and draft forces to said draft gear, said draft gear being normally disposed in its outermost position with said second follower in engagement with said outer stop members and with a major portion of said draft gear casing projecting outwardly of said pocket beyond said outer stop members, said arrangement of parts being such that said draft gear casing is movable inwardly of said center sill upon the application of buff forces thereto through a distance which is approximately equal to the spacing between said inner and outer stop members less the minimum spacing between said first and second followers, a normally extended hydraulic piston-and-cylinder cushion unit mounted in said center sill inwardly of said draft gear pocket, and a force-transmitting member connected between the inner end of said yoke means and the piston of said hydraulic cushion unit whereby said unit serves to cooperate with said friction draft gear in cushioning buff forces applied thereto during said inward movement of said draft gear.

15. The combination recited in claim 14 wherein said connection between the inner end of said yoke means and said force-transmitting member comprises a swivel-type connection which permits certain horizontal and vertical movement of said yoke means relative to said force-transmitting member.

16. The combination recited in claim 14 wherein said hydraulic cushion unit is mounted in said center sill inwardly of said body bolster, wherein a longitudinally extending cylindrical guide tube is provided in said body bolster, and wherein said force-transmitting member extends through said guide tube for longitudinal movement relative thereto.

17. The combination recited in claim 14 wherein said hydraulic cushion unit is mounted in said center sill between said draft gear pocket and said body bolster.

18. In a railway car having a longitudinally extending stationary center sill with an open outer end, the combination of a draft gear pocket adjacent the outer end of said center sill and defined by longitudinally spaced inner and outer stop members, a friction draft gear having an over-all length approximately equal to the length of said pocket mounted in said pocket for relative movement longitudinally thereof, said friction draft gear being characterized by a casing having a closed end defining a first end follower and an open end from which a friction clutch normally projects, by a second end follower separate from said casing and disposed adjacent said friction clutch for relative movement toward said first end follower to actuate said friction clutch, and by rigid radial flange means on said casing at said open end thereof defining a third follower intermediate said first and second followers and spaced from said second follower a distance which is approximately equal to the distance said friction clutch normally projects from said casing and which is substantially less than the length of said pocket, said second and third followers being engageable with said spaced stop members with the arrangement of parts being such that the outer one of said second and third followers is normally disposed against said outer stop members with said draft gear being movable inwardly of said center sill a distance which is approximately equal to the length of said pocket during full closure thereof when buff forces are applied thereto with the inner one of said second and third followers then being disposed against said inner stop members, coupler means at the outer end of said center sill for imparting buff forces to the outer one of said end followers, a yoke operably associated with said coupler means and the inner one of said end followers for imparting draft forces to said draft gear, and separate cushioning means operably associated with said draft gear and adapted to cooperate therewith in cushioning buff forces applied to said coupler means during said inward movement of said draft gear.

19. In a railway car having a longitudinally extending stationary center sill with an open outer end, the combination of a draft gear pocket adjacent the outer end of said center sill and defined by longitudinally spaced inner and outer stop members, a friction draft gear having an over-all length approximately equal to the length of said pocket mounted therein for relative movement longitudinally of said stationary center sill, said friction draft gear being characterized by an open-ended casing positioned in said pocket with its closed end disposed outwardly and defining a non-flanged outer end follower and with its open end opening inwardly of said center sill and having a friction clutch portion normally projecting therefrom, by a separate inner end follower which is disposed inwardly of said casing and which is adapted for actuating engagement with said friction clutch portion upon relative movement of said inner end follower toward said outer end follower, and by rigid radial flange means on said casing at said inner open end thereof defining an intermediate follower which is disposed between said inner and outer end followers, which intermediate follower is normally spaced from said inner end follower a distance which is approximately equal to the distance said friction clutch portion normally projects from the inner end of said casing and which is substantially less than the length of said draft gear pocket, said draft gear being normally disposed in its outermost position relative to said pocket with said intermediate follower in engagement with said outer stop members, coupler means at the outer end of said center sill for imparting buff forces to said outer end follower, said draft gear casing being bodily movable inwardly of said center sill a distance which is approximately equal to the length of said draft gear pocket during full closure of said friction draft gear when buff forces are applied to said outer end follower by said coupler means with said inner end follower being engageable with said inner stop members to limit further inward movement of said draft gear casing, a yoke operably associated with said coupler means and said inner end follower for imparting draft forces to said draft gear, and a hydraulic cushion unit mounted in said center sill inwardly of said draft gear pocket and operably associated with said draft gear, which hydraulic cushion unit is normally in a substantially fully extended condition and is adapted to cooperate with said draft gear in cushioning buff forces applied by said coupler means during said inward movement of said draft gear casing.

20. In a railway car having a longitudinally extending stationary center sill with an open outer end, the combination of a draft gear pocket adjacent the outer end of said center sill and defined by longitudinally spaced inner and outer stop members, a friction draft gear having an overall length approximately equal to the length of said pocket and mounted therein for relative movement longitudinally of said stationary center sill, said friction draft gear being characterized by an open-ended casing positioned in said pocket with its closed end disposed outwardly and defining an outer end follower and with its open end opening inwardly of said center sill and having a friction clutch portion normally projecting therefrom, by a separate inner end follower which is disposed inwardly of said casing and which is adapted for actuating engagement with said friction clutch portion upon relative movement of said inner end follower toward said outer end follower, and by rigid radial flange means on said casing at said inner open end thereof defining an intermediate follower which is disposed between said inner and outer end followers, which intermediate follower is normally spaced from said inner end follower a distance which is approximately equal to the distance said friction clutch portion normally projects from the inner end of said casing and which is substantially less than the length of said draft gear pocket, said draft gear being normally disposed in its outermost position relative to said pocket with said intermediate follower in engagement with said outer stop members, coupler means at the outer end of said center sill for imparting buff forces to said outer end follower, said draft gear casing being bodily movable inwardly of said center sill a distance which is approximately equal to the length of said draft gear pocket during full closure of said friction draft gear when buff forces are applied to said outer end follower by said coupler means with said inner end follower being engageable with said inner stop members to limit further inward movement of said draft gear casing, a coupler carrier slidably mounted on the outer end of said center sill for longitudinal movement relative thereto and having a portion disposed outwardly of the outer end of said center sill for supporting said coupler means, a motion-transmitting connection between said coupler means and said coupler carrier, a hydraulic piston-and-cylinder cushion unit mounted in said center sill inwardly of said draft gear pocket, and force-transmitting means connected between the inner end of said yoke and the piston of said hydraulic cushion unit whereby the latter is adapted to cooperate with said friction draft gear in cushioning buff forces applied to said coupler means during said inward movement of said draft gear casing.

21. The combination recited in claim 20 wherein said motion-transmitting connection between said coupler means and said coupler carrier comprises a lost-motion connection adapted to provide a lag in the inward movement of said coupler carrier relative to the inward movement of said coupler means during the application of buff forces to the latter.

22. The combination recited in claim 20 which is further characterized by a train line which extends along one side of said center sill and has a non-flexible portion at its outer end, by bracket means mounted on one side of said coupler carrier for supporting said non-flexible portion of said train line in a manner such that said non-flexible portion is longitudinally movable with said coupler carrier relative to said stationary center sill, and by a flexible train line portion having its outer end connected to the inner end of said non-flexible train line portion and its inner end rigidly supported relative to said stationary center sill.

References Cited in the file of this patent
UNITED STATES PATENTS

| | | |
|---|---|---|
| 2,283,387 | Olander | May 19, 1942 |
| 2,776,057 | Blattner | Jan. 1, 1957 |
| 2,985,319 | Simmons | May 23, 1961 |
| 2,996,315 | Roth et al. | Aug. 15, 1961 |
| 3,003,436 | Peterson | Oct. 10, 1961 |
| 3,042,223 | Austgen | July 3, 1962 |